(12) United States Patent
Suh et al.

(10) Patent No.: US 10,211,954 B2
(45) Date of Patent: *Feb. 19, 2019

(54) SYSTEM AND METHOD FOR OFDMA TONE ALLOCATION IN NEXT GENERATION WI-FI NETWORKS

(71) Applicant: Huawei Technologies Co., Ltd., Shenzhen (CN)

(72) Inventors: Jung Hoon Suh, Kanata (CA); Osama Aboul-Magd, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/625,795

(22) Filed: Jun. 16, 2017

(65) Prior Publication Data

US 2017/0288825 A1 Oct. 5, 2017

Related U.S. Application Data

(63) Continuation of application No. 14/738,643, filed on Jun. 12, 2015.

(Continued)

(51) Int. Cl.
*H04L 5/00* (2006.01)
*H04W 72/04* (2009.01)
(Continued)

(52) U.S. Cl.
CPC .......... *H04L 5/0007* (2013.01); *H04L 1/0009* (2013.01); *H04L 5/0048* (2013.01);
(Continued)

(58) Field of Classification Search
CPC ....... H04L 5/0007; H04L 27/206; H04J 11/00
(Continued)

(56) References Cited

U.S. PATENT DOCUMENTS 7,308,034 B2 12/2007 Jeon et al.
7,742,392 B2 * 6/2010 Ge ...................... H04L 27/2657
370/206

(Continued)

FOREIGN PATENT DOCUMENTS

CN 101547170 A 9/2009
CN 101635619 A 1/2010
(Continued)

OTHER PUBLICATIONS

"IEEE P802.11 Wireless LANs: Specification Framework for TGax," IEEE 802.11-15/0132r8, Sep. 22, 2015, pp. 1-22. (Specification Framework Documentation on the IEEE 802.11ax).

(Continued)

*Primary Examiner* — Brenda H Pham
(74) *Attorney, Agent, or Firm* — Slater Matsil, LLP

(57) ABSTRACT

An orthogonal frequency division multiple access (OFDMA) frame tone allocation includes a 256 tone payload consisting of 228 data and pilot tones and 28 null tones. The 28 null tones consist of guard tones and at least one direct current (DC) tone. In one example, the 256 tone payload consists of 224 data tones, 4 common pilot tones, and 28 null tones. In another example, the 256 tone payload consists of 222 data tones, 6 common pilot tones, and 28 null tones. In yet another example, the 256 tone payload may consist of 220 data tones, 8 common pilot tones, and 28 null tones. The OFDMA frame may be a downlink OFDMA frame or an uplink OFDMA frame.

23 Claims, 6 Drawing Sheets

Related U.S. Application Data

(60) Provisional application No. 62/011,475, filed on Jun. 12, 2014, provisional application No. 62/020,902, filed on Jul. 3, 2014, provisional application No. 62/028,208, filed on Jul. 23, 2014.

(51) Int. Cl.
*H04L 1/00* (2006.01)
*H04L 27/26* (2006.01)
*H04W 84/12* (2009.01)

(52) U.S. Cl.
CPC ........ *H04L 5/0053* (2013.01); *H04L 27/2602* (2013.01); *H04W 72/0453* (2013.01); *H04L 27/2636* (2013.01); *H04W 84/12* (2013.01)

(58) Field of Classification Search
USPC ............ 370/203, 208, 349, 310.2, 328, 338
See application file for complete search history.

(56) References Cited

U.S. PATENT DOCUMENTS

| | | | |
|---|---|---|---|
| 8,125,885 B2* | 2/2012 | Bertrand | H04L 27/2657 370/203 |
| 8,437,440 B1 | 5/2013 | Lhang et al. | |
| 8,571,010 B1 | 10/2013 | Zhang et al. | |
| 9,722,740 B2* | 8/2017 | Suh | H04L 5/0007 |
| 2005/0259569 A1 | 11/2005 | Cimini, Jr. et al. | |
| 2005/0286408 A1 | 12/2005 | Jin et al. | |
| 2006/0279435 A1 | 12/2006 | Krishnan et al. | |
| 2007/0297323 A1 | 12/2007 | Seki | |
| 2008/0232239 A1 | 9/2008 | Mujtaba et al. | |
| 2008/0303508 A1* | 12/2008 | Kwak | H04L 27/2657 324/76.52 |
| 2009/0080388 A1 | 3/2009 | Rohfleisch et al. | |
| 2009/0225888 A1 | 9/2009 | Noh et al. | |
| 2010/0040159 A1 | 2/2010 | Lee et al. | |
| 2010/0080114 A1 | 4/2010 | Ratnam et al. | |
| 2010/0111220 A1 | 5/2010 | Rouquelle-Leveil et al. | |
| 2010/0316042 A1 | 12/2010 | Hirakawa | |
| 2011/0013532 A1 | 1/2011 | Wu et al. | |
| 2011/0032875 A1 | 2/2011 | Erceg et al. | |
| 2011/0038324 A1 | 2/2011 | Park et al. | |
| 2011/0051636 A1 | 3/2011 | Van Nee et al. | |
| 2012/0008571 A1 | 1/2012 | Li et al. | |
| 2012/0127940 A1 | 5/2012 | Lee et al. | |
| 2012/0263157 A1 | 10/2012 | Porat | |
| 2013/0121244 A1 | 5/2013 | Vermani et al. | |
| 2013/0170440 A1 | 7/2013 | Tavildar et al. | |
| 2013/0216002 A1 | 8/2013 | Suh et al. | |
| 2013/0235773 A1 | 9/2013 | Wang et al. | |
| 2013/0243115 A1 | 9/2013 | Taghavi Nasrabadi et al. | |
| 2013/0266086 A1 | 10/2013 | Yang et al. | |
| 2014/0057637 A1 | 2/2014 | Hoang et al. | |
| 2015/0063334 A1 | 3/2015 | Vermani et al. | |
| 2015/0139119 A1 | 5/2015 | Azizi et al. | |
| 2015/0146653 A1 | 5/2015 | Zhang et al. | |
| 2015/0236880 A1 | 8/2015 | Zhang et al. | |
| 2015/0312077 A1 | 10/2015 | Porat | |
| 2015/0327276 A1 | 11/2015 | Rebeiz et al. | |
| 2015/0334708 A1 | 11/2015 | Lee et al. | |
| 2015/0349995 A1 | 12/2015 | Zhang et al. | |
| 2015/0365203 A1 | 12/2015 | Suh et al. | |
| 2015/0365257 A1 | 12/2015 | Suh et al. | |
| 2015/0365922 A1 | 12/2015 | Suh et al. | |
| 2015/0365947 A1 | 12/2015 | Suh et al. | |
| 2016/0301451 A1 | 10/2016 | Seok | |
| 2016/0323124 A1 | 11/2016 | Srinivasa et al. | |
| 2016/0353370 A1 | 12/2016 | Choi et al. | |
| 2018/0062899 A1 | 3/2018 | Zhang et al. | |

FOREIGN PATENT DOCUMENTS

| | | |
|---|---|---|
| CN | 101855851 A | 10/2010 |
| CN | 102972077 A | 3/2013 |
| CN | 106664187 A | 5/2017 |
| EP | 2357773 A2 | 8/2011 |
| JP | 2009118404 A | 5/2009 |
| JP | 2011511527 A | 4/2011 |
| JP | 2012217114 A | 11/2012 |
| JP | 2013531955 A | 8/2013 |
| JP | 2013535932 A | 9/2013 |
| KR | 20050123041 A | 12/2005 |
| KR | 20080109311 A | 12/2008 |
| WO | 2006092852 A1 | 9/2006 |
| WO | 2008026891 A1 | 3/2008 |
| WO | 2012006393 A1 | 1/2012 |
| WO | 2012082306 A2 | 6/2012 |
| WO | 2013033231 A2 | 3/2013 |
| WO | 2013151869 A1 | 10/2013 |

OTHER PUBLICATIONS

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz," IEEE P802.11acTM/D3.0, Jun. 2012, 385 pages.

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Computer Society, IEEE STD 802.11, Mar. 29, 2012, 2,793 pages.

Pascual-Iserte, A., et al., "Residual Carrier Frequency Offset Estimation and Correction in OFDM MIMO Systems," IEEE 18th International Symposium on Personal, Indoor and Mobile Radio Communications, Sep. 3-7, 2007, pp. 1-5.

Haring, L., et al., "Fine Frequency Synchronization in the Uplink of Multiuser OFDM Systems," in IEEE Transactions on Communications, vol. 57, No. 12, pp. 3743-3752, Dec. 2009.

Kim, J., et al., "Joint Carrier Frequency Offset and Channel Estimation for Uplink MIMO-OFDMA Systems Using Parallel Schmidt Rao-Blackwellized Particle Filters," in IEEE Transactions on Communications, vol. 58, No. 9, pp. 2697-2708, Sep. 2010.

* cited by examiner

SYSTEM AND METHOD FOR OFDMA TONE ALLOCATION IN NEXT GENERATION WI-FI NETWORKS

This patent application is a continuation of U.S. patent application Ser. No. 14/738,643, filed on Jun. 12, 2015 and entitled "System and Method for OFDMA Tone Allocation in Next Generation Wi-Fi Networks," which claims priority to U.S. Provisional Application No. 62/011,475, filed on Jun. 12, 2014 and entitled "System and Method for OFDMA Tone Allocation in Next Generation Wi-Fi Networks," to U.S. Provisional Application No. 62/020,902, filed on Jul. 3, 2014 and entitled "System and Method for Orthogonal Frequency Division Multiple Access" and to U.S. Provisional Application No. 62/028,208, filed on Jul. 23, 2014 and entitled "System and Method for OFDMA Resource Allocation," all of which are hereby incorporated by reference herein as if reproduced in their entireties.

TECHNICAL FIELD

The present invention relates to a system and method for wireless communications, and, in particular embodiments, to a system and method for OFDMA tone allocation in the next generation Wi-Fi networks.

BACKGROUND

Next generation Wireless Local Area Networks (WLANs) will be deployed in high-density environments that include multiple access points providing wireless access to large numbers of mobile stations in the same geographical area. Next-generation WLANs will also need to simultaneously support various traffic types having diverse quality of service (QoS) requirements, as mobile devices are increasingly used to access streaming video, mobile gaming, and other services. Institute of Electrical and Electronics Engineers (IEEE) 802.11ax is being developed to address these challenges, and is expected to provide up to four times the throughput of IEEE 802.11ac networks.

SUMMARY OF THE INVENTION

Technical advantages are generally achieved, by embodiments of this disclosure which describe a system and method for OFDMA tone allocation in the next generation Wi-Fi networks.

In accordance with an embodiment, a method for receiving an uplink frame in a wireless network is provided. In this example, the method includes receiving an uplink orthogonal frequency division multiple access (OFDMA) frame over a 20 megahertz (MHz) frequency channel. The uplink OFDMA frame comprises resource units (RUs) communicated by different mobile devices. Each of the RUs in the OFDMA frame carries a separate pilot signal. The method further includes performing residual carrier frequency offset estimation on the uplink OFDMA frame in accordance with the separate pilot signals carried by the RUs. An apparatus for performing this method is also provided.

In accordance with an embodiment, a method for transmitting an uplink signal in a wireless network is provided. In this example, the method includes transmitting a first resource unit (RU) in an uplink orthogonal frequency division multiple access (OFDMA) frame. The OFDMA frame carries the first RU and at least a second RU transmitted by a second mobile device. The first RU carries a first pilot signal and the second RU carries a second pilot signal that is separate from the first pilot signal. An apparatus for performing this method is also provided.

In accordance with an embodiment, method for transmitting resource units in a wireless communication system is provided. In this example, the method includes generating an orthogonal frequency division multiple access (OFDMA) frame for communicating over a 20 megahertz (MHz) frequency channel. The OFDMA frame comprises a 256 tone payload that consists of 228 data and pilot tones and 28 null tones. The 28 null tones consist of guard tones and at least one direct current (DC) tone. The method further includes transmitting the OFDMA frame to at least one receiver. An apparatus for performing this method is also provided.

In accordance with another embodiment, another method for transmitting resource units in a wireless communication system is provided. In this example, the method includes generating an orthogonal frequency division multiple access (OFDMA) frame for communicating over a 20 megahertz (MHz) frequency channel. The OFDMA frame comprises a 256 tone payload consisting of 224 data and pilot tones and 32 null tones. The 32 null tones consist of guard tones and at least one direct current (DC) tone. The method further includes transmitting the OFDMA frame to at least one receiver. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
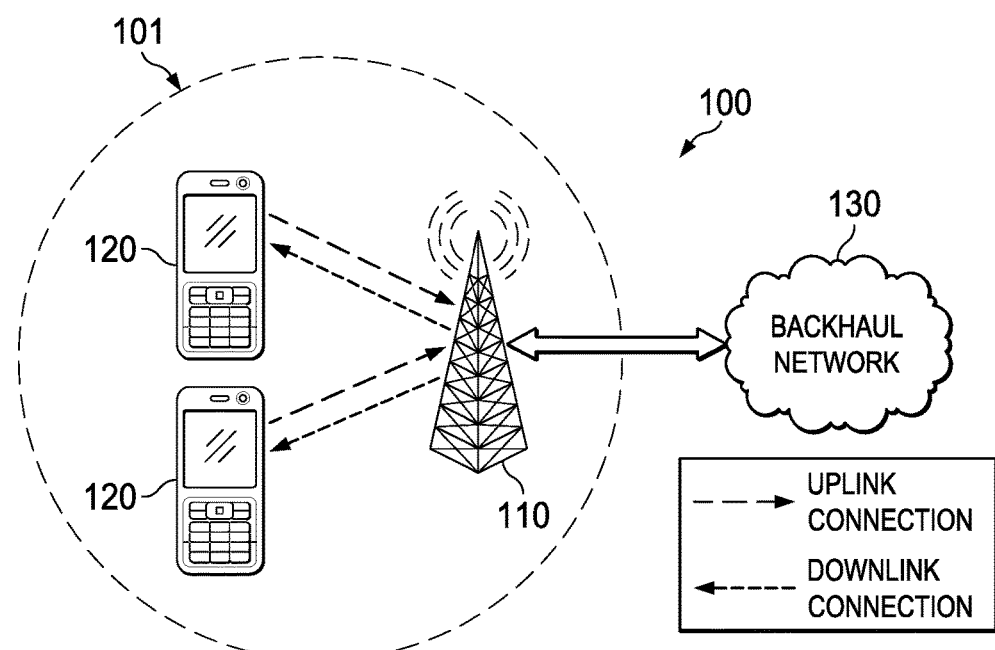
FIG. 1 illustrates a diagram of an embodiment wireless communications network.

The making and using of embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. OFDMA tone allocations are discussed in U.S. Non-Provisional application Ser. No. 14/738,411, which is incorporated by reference herein as if reproduced in its entirety.

IEEE 802.11ax networks will utilize OFDMA for uplink transmissions such that different resource units (RUs) of a single OFDMA frame are communicated by different mobile devices. Notably, RUs transmitted by different mobile devices may not be completely aligned in the frequency domain, which may result in loss of orthogonality among subcarriers. Aspects of this disclosure include pilot symbols in resource units (RUs) of uplink OFDMA frames in order to allow access points (APs) to perform residual carrier frequency offset compensation upon reception. Access points may perform residual frequency offset compensation by tracking a phase of symbols in the RUs based on pilots carried in the respective RUs. In some embodiments, a single pilot is carried in each RU. In other embodiments, multiple pilots are carried in each RU. In one example, the uplink OFDMA frame carries a fourteen tone RU consisting of 12 data tones and 2 pilot tones. In another example, the uplink OFDMA frame carries a sixteen tone RU consisting of 15 data tones and 2 pilot tones. In yet another embodiment, the uplink OFDMA frame carries a twenty-eight tone RU consisting of 26 data tones and 2 pilot tones.

Aspects of this disclosure provide embodiment OFDMA frame tone allocations for IEEE 802.11ax networks. In one embodiment, an OFDMA frame includes a 256-tone payload consisting of 228 data and pilot tones and 28 null tones. The 28 null tones consist of guard tones and at least one direct current (DC) tone. In one example, the 256-tone payload consists of 224 data tones, 4 common pilot tones, and 28 null tones. In another example, the 256-tone payload consists of 222 data tones, 6 common pilot tones, and 28 null tones. In yet another example, the 256-tone payload may consist of 220 data tones, 8 common pilot tones, and 28 null tones. The OFDMA frame may be a downlink OFDMA frame or an uplink OFDMA frame.

In another embodiment, an OFDMA frame includes a 256-tone payload consisting of 224 data and pilot tones and 32 null tones. In one example, the 256-tone payload consists of 220 data tones, 4 common pilot tones, and 32 null tones. In another example, the 256-tone payload consists of 218 data tones, 6 common pilot tones, and 32 null tones. In yet another example, the 256-tone payload consists of 216 data tones, 8 common pilot tones, and 32 null tones. The OFDMA frame may be a downlink OFDMA frame or an uplink OFDMA frame. These and other aspects are described in greater detail below.

FIG. 1 illustrates a wireless network 100 for communicating data. The wireless network 100 includes an access point (AP) 119 having a coverage area 101, a plurality of mobile devices 120, and a backhaul network 130. The AP 110 may comprise any component capable of providing wireless access by, among other things, establishing uplink (dashed line) and/or downlink (dotted line) connections with the mobile devices 120, such as a base station, an enhanced base station (eNB), a femtocell, and other wirelessly enabled devices. The mobile devices 120 may comprise any component capable of establishing a wireless connection with the AP 110, such as a mobile station (STA), or other wirelessly enabled devices. The backhaul network 130 may be any component or collection of components that allow data to be exchanged between the AP 110 and a remote end. In some embodiments, there may be multiple such networks, and/or the network may comprise various other wireless devices, such as relays, low power nodes, etc.

Figure 2:
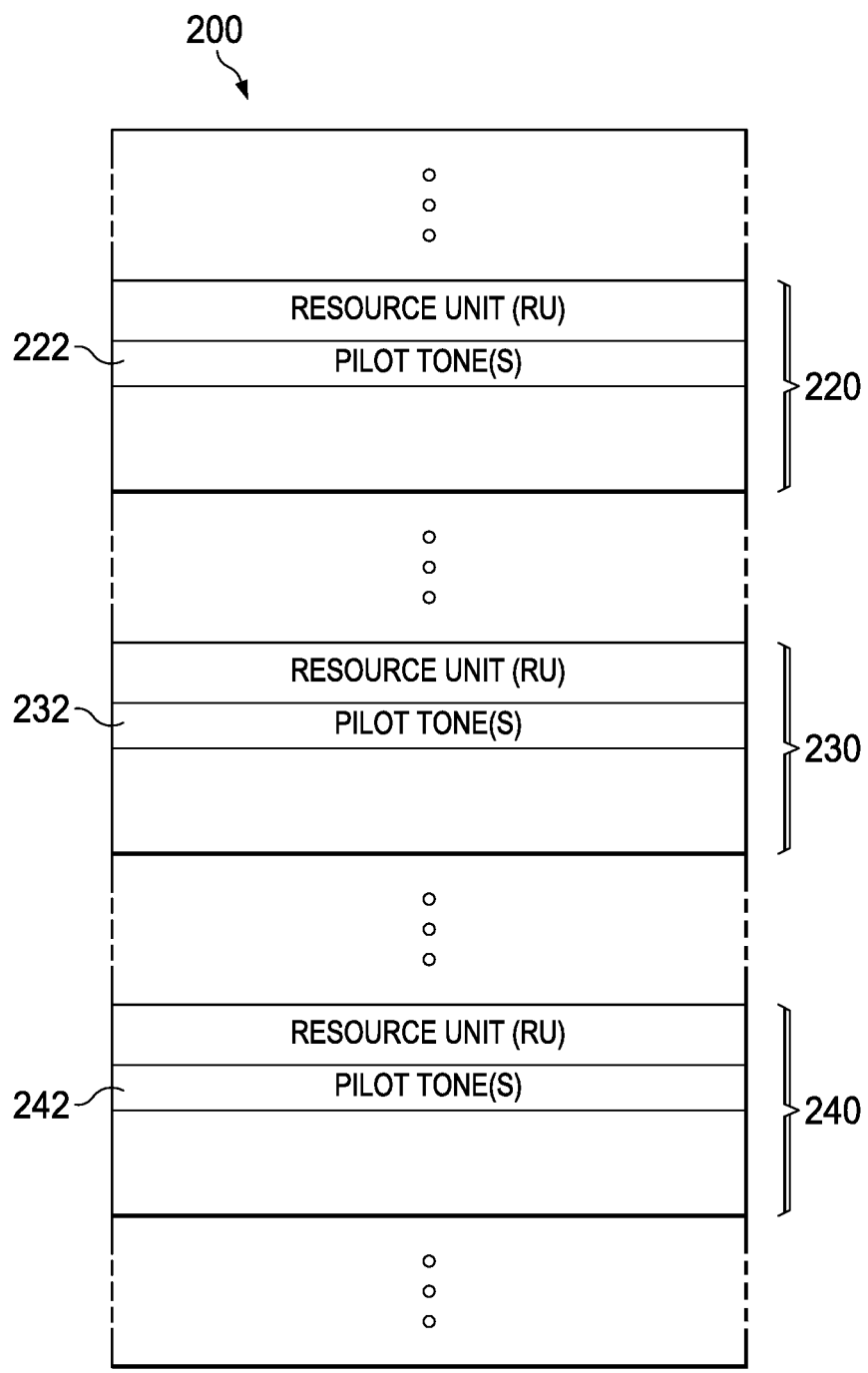
FIG. 2 illustrates a diagram of an embodiment uplink OFDMA frame.

Aspects of this disclosure include separate pilot signals in RUs carried in uplink orthogonal frequency division multiple access (OFDMA) frames. FIG. 2 illustrates an uplink OFDMA frame 200 carrying a plurality of RUs 220, 230, 240 each of which includes one or more separate pilot tones 222, 232, 242, respectively. At least some of the RUs 220, 230, 240 are transmitted by different mobile stations. It should be appreciated that the number of RUs carried in an OFDMA frame may depend on characteristics (e.g., sizes) of the OFDMA frame and/or the RUs. The separate pilot tones 222, 232, 242 may be dedicated to the corresponding RU 220, 230, 240. In some embodiments, each of the RUs 220, 230, 240 carry a single pilot tone. In other embodiments, at least one of the RUs 220, 230, 240 carry multiple pilot tones. In some implementations, different RUs 220, 230, 240 carry different numbers of pilot tones. The access point (AP) receiving the uplink OFDMA frame 200 may perform residual carrier frequency offset estimation on the uplink OFDMA frame 200 in accordance with the separate pilot tone(s) 222, 232, 242 carried by the respective RUs 220, 230, 240.

Figure 3:
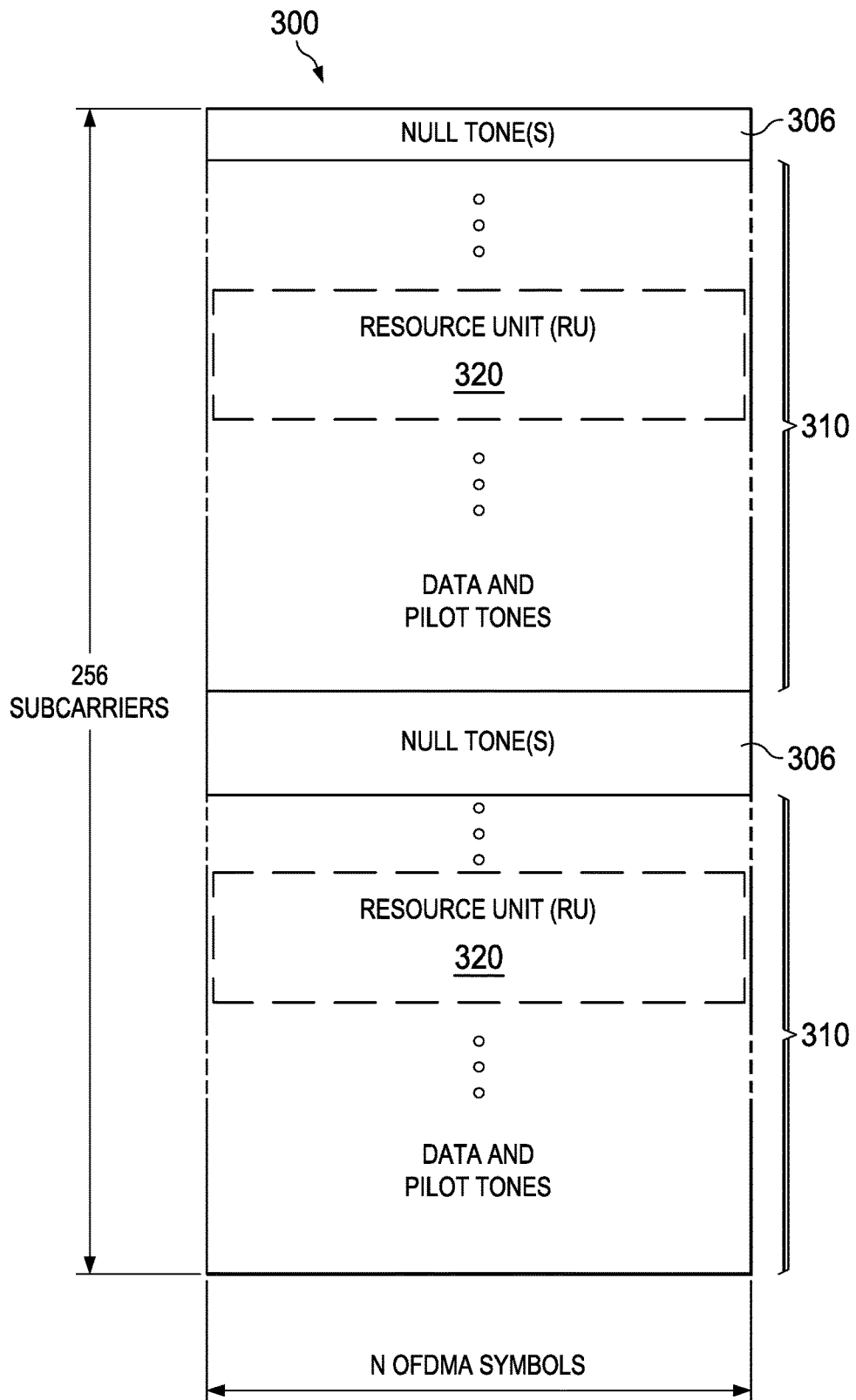
FIG. 3 illustrates a diagram of an embodiment tone allocation scheme for a 256-tone payload of an OFDMA frame.

FIG. 3 illustrates a diagram of an embodiment tone allocation scheme for a 256-tone payload 300 of an OFDMA frame to be communicated over a 20 MHz frequency channel. The OFDMA frame may be a downlink OFDMA frame or an uplink OFDMA frame. As shown, the 256-tone payload 300 includes data and pilot tones 310, as well as null tones 306. The null tones 306 consist of guard tones and at least one direct current (DC) tone. The guard tones may prevent overlapping of OFDMA symbols and reduce inter-symbol interference. The DC tone(s) may be located on the first and/or last subcarrier(s) and guard tones may be located around or near a center subcarrier of the OFDMA frame. The data and pilot tones 310 may be partitioned into a plurality of resource units (RUs) 320.

In an embodiment, the 256-tone payload 300 consists of 228 data and pilot tones 310 and 28 null tones 306. In one example, the 228 data and pilot tones 310 consists of 224 data tones and 4 common pilot tones. In another example, the 228 data and pilot tones 310 consists of 222 data tones and 6 common pilot tones. In yet another example, the 228 data and pilot tones 310 consists of 220 data tones and 8 common pilot tones.

In another embodiment, the 256-tone payload 300 consists of 224 data and pilot tones 310 and 32 null tones 306. In one example, the 224 data and pilot tones 310 consists of 220 data tones and 4 common pilot tones. In another example, the 224 data and pilot tones 310 consists of 218 data tones and 6 common pilot tones. In yet another example, the 224 data and pilot tones 310 consists of 216 data tones and 8 common pilot tones.

Figure 4:
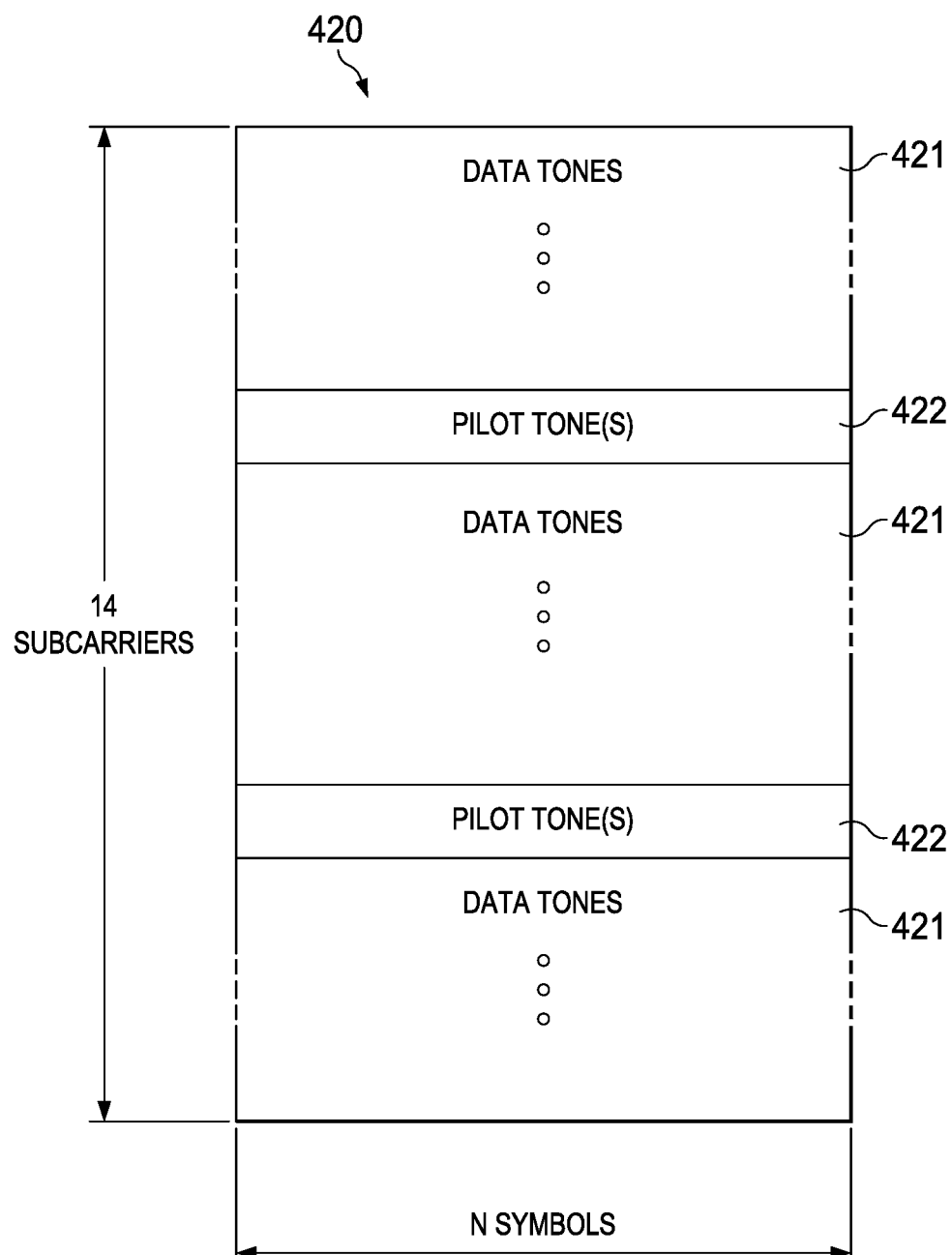
FIG. 4 illustrates a diagram of an embodiment tone allocation scheme for an OFDMA resource unit (RU)

At least some of the data and pilot tones 310 may be partitioned into one or more resource units (RUs) 320, which may be distributed over the OFDMA frame 200. FIG. 4 illustrates a diagram of an embodiment tone allocation scheme for an OFDMA resource unit (RU) 400. As shown, the OFDMA RU 400 comprises data tones 421 and pilot tones 422. In one embodiment, the OFDMA RU 400 is a fourteen tone RU consisting of 12 data tones 421 and 2 pilot tones 422. In yet another embodiment, the OFDMA RU 400 is a twenty-eight tone RU consisting of 26 data tones 421 and 2 pilot tones 422.

Figure 5:
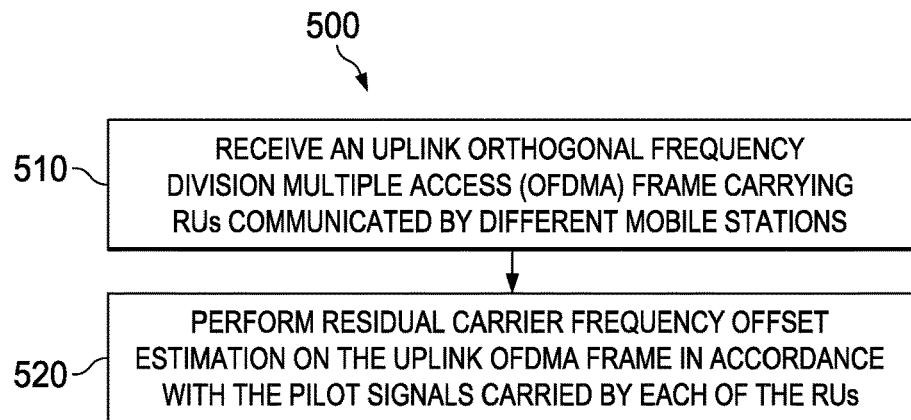
FIG. 5 illustrates a flowchart of an embodiment method for receiving uplink OFDMA frames.

FIG. 5 illustrates a flowchart of an embodiment method 500 for receiving uplink OFDMA frames, as might be performed by an access point (AP). As shown, the method 500 begins at step 510, where the AP receives an OFDMA frame carrying RUs communicated by different mobile stations. Each of the RUs carries a separate pilot signal. Next, the method 500 proceeds to step 520, where the AP performs residual carrier frequency offset estimation on the uplink OFDMA frame in accordance with the pilot signals carried by each of the RUs. Residual frequency offset compensation may include estimating a carrier frequency offset based on dedicated pilots carried in OFDMA transmissions. For uplink (UL) OFDMA transmissions, residual carrier frequency offset compensation may allow the access point to track a phase of each symbol based on pilots carried in resource units (RUs).

Notably, residual carrier frequency offset compensation may also be performed on downlink (DL) OFDMA transmissions based on pilots carried in OFDM symbols. Residual carrier frequency offset compensation may be represented by the following formula: $Y_{n,k}=H_k P_{n,k} e^{j2\pi n\varepsilon}$ where Y is the received signal, n is the symbol index, k is the subcarrier index where pilots are located, H is the channel, P is the pilot, and $\varepsilon$ is the residual carrier frequency offset. In an embodiment, residual carrier frequency offset compensation may be performed according to the following formula:

$$\hat{\varepsilon} = \frac{\hat{\theta}_n}{2\pi},$$

where $$\hat{\theta}_n = \angle\left[\sum_{k=pilots} Y_{n,k}(H_k P_{n,k})^*\right] = \angle\left[e^{j2\pi n\varepsilon}\sum_{k=pilots}|H_k|^2\right].$$

As 802.11 in TGax adopts OFDMA as the new spectrum utilization method, techniques for setting the granularity on the minimum resource units (RUs) in the frequency domain are needed. Initial tone allocations for the various possible combinations of granularity were proposed in U.S. Provisional Patent Application 62/001,394 filed on May 21, 2014, which is incorporated herein by reference as if reproduced in its entirety. Aspects of this disclosure provide additional tone allocation design/patterns.

Embodiments of this disclosure set the tone allocation of an OFDM symbol with 256 FFT per 20 MHz. The proposal in U.S. Provisional Patent Application 62/001,394 set the number of guard tones at twenty-seven and the DC null at one for 256 FFT per 20 MHz, thereby providing 228 available tones for data and pilot signals. In some implementations, 228 tones may not have been enough tones to support the number of pilots in an OFDMA symbol or a RU. Aspects of this disclosure provide an alternative tone allocation.

In DL OFDMA, there may be four, six, or eight pilots. For UL OFDMA, there may be one or more pilots (e.g., one pilot, two pilots, etc.) for each RU. Aspects of this disclosure provide 224 tones available for data and pilots, with thirty-two tones being reserved for guard tones and DC null tones. If 224 data and pilot tones are provided for DL OFDMA, then it is possible to support four, six, or eight pilots in a 20 MHz OFDMA symbol, with 220, 218, or 216 tones being available for carrying data. In some embodiments, the input and output bits at the channel encoder are integer multiples for some or all MCS cases.

As for the UL OFDMA, pilots may be provided for every RU. When there are sixteen RUs per 20 MHz OFDMA symbol, then fourteen tones (e.g., twelve data tones and two pilot tones) may be provided for each RU. When there are fourteen RUs per 20 MHz OFDMA symbol, then sixteen tones (e.g., fourteen data tones and two pilot tones) may be provided for each RU. When there are eight RUs per 20 MHz OFDMA symbol, then twenty-eight tones (e.g., twenty-six data tones and two pilot tones) may be provided for each RU. Other combinations are also possible.

Figure 6:
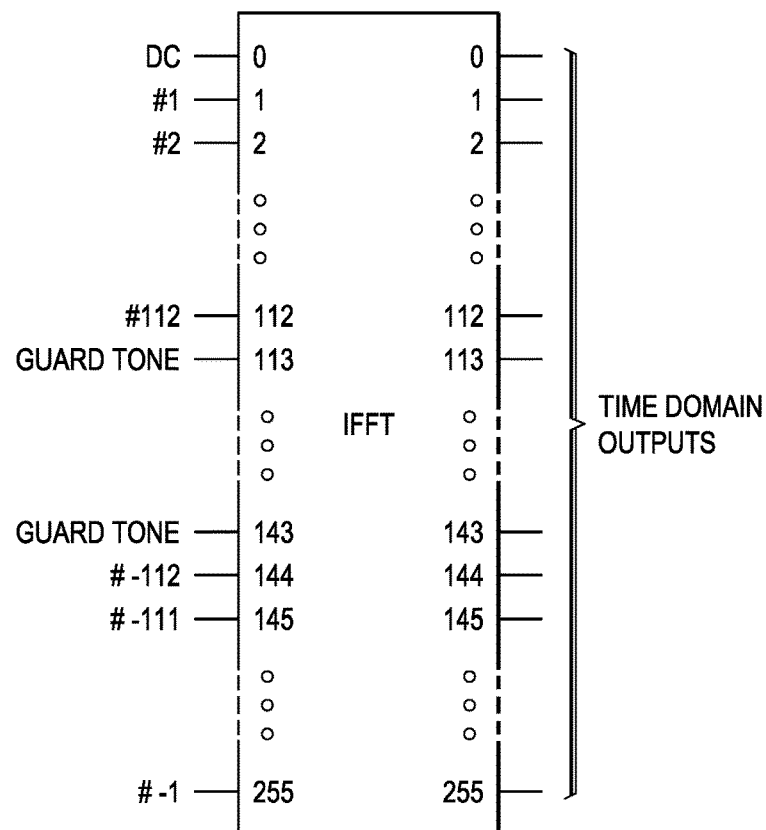
FIG. 6 illustrates a diagram of an input/output configuration of an IFFT module.

FIG. 6 illustrates an input/output configuration of an IFFT module. The input/output configuration of the inverse FFT (IFFT) module may be updated based on the proposed tone assignments described above. Embodiments of this disclosure provide an input/output configuration of the IFFT module for 256 FFT per 20 MHz under the 802.11ac TX spectral mask for the tone allocation proposed by this disclosure.

Figure 7:
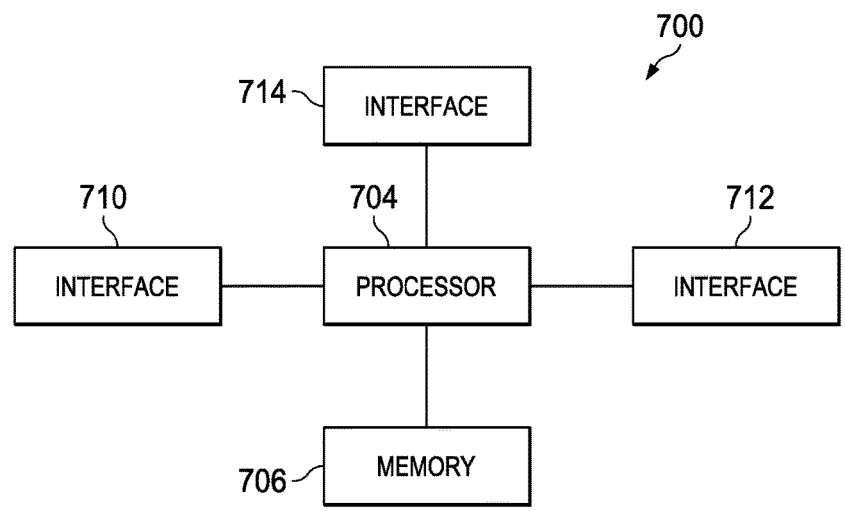
FIG. 7 illustrates a diagram of an embodiment processing system.

FIG. 7 illustrates a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
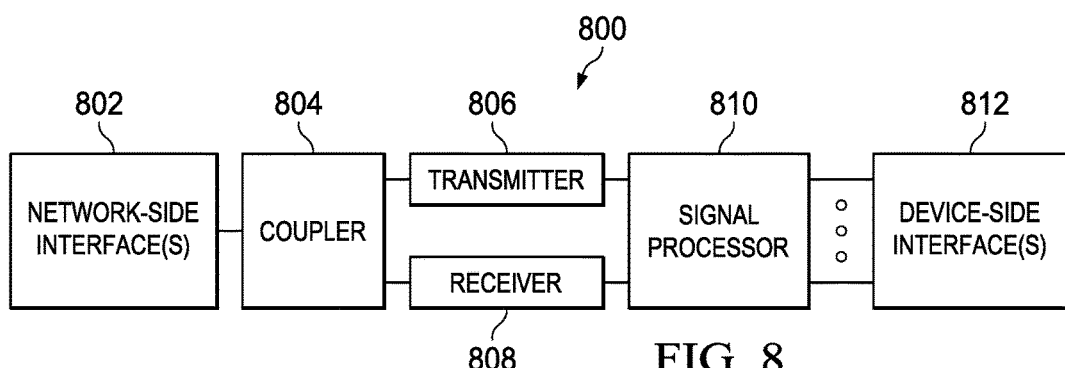
FIG. 8 illustrates a diagram of an embodiment transceiver.

In some embodiments, one or more of the interfaces 710, 712, 714 connects the processing system 700 to a transceiver adapted to transmit and receive signaling over the telecommunications network. FIG. 8 illustrates a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The following references are related to subject matter of the present application. Each of these references is incorporated herein by reference in its entirety:

[1] Mujtaba et al., IEEE 802.11-04/887r1, "TGn Sync Complete Proposal" (September 2004) (copy provided herewith).

[2] Suh et al., U.S. Provisional Patent Application Ser. No. 61/974,282, "UL OFDMA Frame Format and Input/Output Configuration for IFFT module for OFDM(A) Numerologies" (Apr. 2, 2014).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for receiving an uplink frame in a wireless communication system, the method comprising:
    receiving, by an access point (AP), an uplink orthogonal frequency division multiple access (OFDMA) frame over a channel spanning at least 20 megahertz (MHz) in the frequency domain, wherein the uplink OFDMA frame comprises resource units (RUs) communicated by different mobile devices, wherein each of the RUs in the uplink OFDMA frame carries at least two pilot tones; and
    performing residual carrier frequency offset estimation on the uplink OFDMA frame by tracking phase components of the pilot tones carried by each of the RUs.

2. The method of claim 1, wherein the pilot tones of a first RU in the uplink OFDMA frame are separate from the pilot tones of a second RU in the OFDMA frame.

3. The method of claim 1, wherein the RUs include a first RU having a first number of pilot tones, and a second RU having a second number of pilot tones different from the first number of pilot tones.

4. The method of claim 1, wherein the uplink OFDMA frame further includes data tones, and wherein at least some of the data tones and pilot tones are partitioned into a first RU having a first number of tones or a second RU having a second number of tones, the second number being double the first number.

5. The method of claim 1, wherein the uplink OFDMA frame has a 256-tone payload over a 20 MHz channel, including data tones, null tones, and the pilot tones.

6. The method of claim 1, wherein performing residual carrier frequency offset estimation comprises performing residual carrier frequency offset estimation according to the formula:

$$\hat{\varepsilon} = \frac{\hat{\theta}_n}{2\pi},$$

where $$\hat{\theta}_n = \angle\left[\sum_{k=pilots} Y_{n,k}(H_k P_{n,k})^*\right] = \angle\left[e^{j2\pi n\varepsilon}\sum_{k=pilots}|H_k|^2\right]$$

where Y is the received signal, n is the symbol index, k is the subcarrier index where pilots are located, H is the channel, P is the pilot, and ε is the residual carrier frequency offset.

7. An apparatus comprising:
    a processor; and
    a computer readable storage medium storing programming for execution by the processor, the programming including instructions to:
    receive an uplink orthogonal frequency division multiple access (OFDMA) frame over a channel spanning at least 20 megahertz (MHz) in the frequency domain, wherein the uplink OFDMA frame comprises resource units (RUs) communicated by different mobile devices, wherein each of the RUs in the uplink OFDMA frame carries at least two pilot tones; and
    perform residual carrier frequency offset estimation on the uplink OFDMA frame by tracking phase components of the pilot tones carried by the RUs.

8. The apparatus of claim 7, wherein the RUs include a first RU having a first number of pilot tones, and a second RU having a second number of pilot tones different from the first number of pilot tones.

9. The apparatus of claim 7, wherein the uplink OFDMA frame further includes data tones, and wherein at least some of the data tones and pilot tones are partitioned into a first RU having a first number of tones or a second RU having a second number of tones, the second number being double the first number.

10. The apparatus of claim 7, wherein the uplink OFDMA frame has a 256-tone payload over a 20 MHz channel, including data tones, null tones, and the pilot tones.

11. The apparatus of claim 5, wherein performing residual carrier frequency offset estimation comprises performing residual carrier frequency offset estimation according to the formula:

$$\hat{\varepsilon} = \frac{\hat{\theta}_n}{2\pi},$$

where $$\hat{\theta}_n = \angle\left[\sum_{k=pilots} Y_{n,k}(H_k P_{n,k})^*\right] = \angle\left[e^{j2\pi n\varepsilon}\sum_{k=pilots}|H_k|^2\right]$$

where Y is the received signal, n is the symbol index, k is the subcarrier index where pilots are located, H is the channel, P is the pilot, and ε is the residual carrier frequency offset.

12. A method for transmitting an uplink signal in a wireless network, the method comprising:

transmitting, by a first mobile device, a first resource unit (RU) in an uplink orthogonal frequency division multiple access (OFDMA) frame, the OFDMA frame carrying the first RU and at least a second RU transmitted by a second mobile device, wherein the first RU carries at least two pilot tones and the second RU carries at least two pilot tones that are separate from the at least two pilot tones carried by the first RU, wherein the at least two pilot tones carried by the first RU and the at least two pilot tones carried by the second RU are used by an access point to perform carrier frequency offset estimation on the uplink OFDMA frame.

13. The method of claim 12, wherein the access point performs carrier frequency offset estimation on the uplink OFDMA frame by tracking phase components of the at least two pilot tones carried by the first RU and the at least two pilot tones carried by the second RU.

14. The method of claim 12, wherein the RUs include a first RU having a first number of pilot tones, and a second RU having a second number of pilot tones different from the first number of pilot tones.

15. The method of claim 12, wherein the uplink OFDMA frame further includes data tones, and wherein at least some of the data tones and pilot tones are partitioned into a first RU having a first number of tones or a second RU having a second number of tones, the second number being double the first number.

16. The method of claim 12, wherein the uplink OFDMA frame has a 256-tone payload over a 20 MHz channel, including data tones, null tones, and the pilot tones.

17. The method of claim 12, wherein performing residual carrier frequency offset estimation comprises performing residual carrier frequency offset estimation according to the formula:

$$\hat{\varepsilon} = \frac{\hat{\theta}_n}{2\pi},$$

where $$\hat{\theta}_n = \angle\left[\sum_{k=pilots} Y_{n,k}(H_k P_{n,k})^*\right] = \angle\left[e^{j2\pi n\varepsilon} \sum_{k=pilots} |H_k|^2\right]$$

where Y is the received signal, n is the symbol index, k is the subcarrier index where pilots are located, H is the channel, P is the pilot, and ε is the residual carrier frequency offset.

18. A first mobile device comprising:
a processor; and
a computer readable storage medium storing programming for execution by the processor, the programming including instructions to:
transmit a first resource unit (RU) in an uplink orthogonal frequency division multiple access (OFDMA) frame, the OFDMA frame carrying the first RU and at least a second RU transmitted by a second mobile device, wherein the first RU carries at least two pilot tones and the second RU carries at least two pilot tones that are separate from the at least two pilot tones carried by the first RU, wherein the at least two pilot tones carried by the first RU and the at least two pilot tones carried by the second RU are used by an access point to perform carrier frequency offset estimation on the uplink OFDMA frame.

19. The first mobile device of claim 18, wherein the access point performs carrier frequency offset estimation on the uplink OFDMA frame by tracking phase components of the at least two pilot tones carried by the first RU and the at least two pilot tones carried by the second RU.

20. The first mobile device of claim 18, wherein the RUs include a first RU having a first number of pilot tones, and a second RU having a second number of pilot tones different from the first number of pilot tones.

21. The first mobile device of claim 18, wherein the uplink OFDMA frame further includes data tones, and wherein at least some of the data tones and pilot tones are partitioned into a first RU having a first number of tones or a second RU having a second number of tones, the second number being double the first number.

22. The first mobile device of claim 18, wherein the uplink OFDMA frame has a 256-tone payload over a 20 MHz channel, including data tones, null tones, and the pilot tones.

23. The first mobile device of claim 18, wherein performing residual carrier frequency offset estimation comprises performing residual carrier frequency offset estimation according to the formula:

$$\hat{\varepsilon} = \frac{\hat{\theta}_n}{2\pi},$$

where $$\hat{\theta}_n = \angle\left[\sum_{k=pilots} Y_{n,k}(H_k P_{n,k})^*\right] = \angle\left[e^{j2\pi n\varepsilon} \sum_{k=pilots} |H_k|^2\right]$$

where Y is the received signal, n is the symbol index, k is the subcarrier index where pilots are located, H is the channel, P is the pilot, and ε is the residual carrier frequency offset.

* * * * *